(12) United States Patent
Burke et al.

(10) Patent No.: US 6,310,911 B1
(45) Date of Patent: Oct. 30, 2001

(54) METHOD OF DETECTING SIGNAL DEGRADATION FAULT CONDITIONS WITHIN SONET AND SDH SIGNALS

(75) Inventors: Dan Burke, Nepean; Alan Jennings, Kanata, both of (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/021,833

(22) Filed: Feb. 11, 1998

(30) Foreign Application Priority Data

Feb. 11, 1997 (CA) .................................................. 2197263

(51) Int. Cl.⁷ .................................................. H04B 17/00
(52) U.S. Cl. .................. 375/224; 375/227; 375/228; 714/48; 714/704; 370/241; 370/242
(58) Field of Search ...................... 375/224, 227, 375/228; 714/48, 49, 51, 52, 704, 712; 370/241, 242, 252

(56) References Cited

U.S. PATENT DOCUMENTS

| | | | |
|---|---|---|---|
| 4,375,102 | * | 2/1983 | Van Daal ................................ 375/94 |
| 5,138,616 | * | 8/1992 | Wagner, Jr. et al. .................. 371/5.1 |
| 5,271,011 | * | 12/1993 | McMullan, Jr. et al. ............. 371/5.3 |
| 5,418,789 | * | 5/1995 | Gersbach et al. ...................... 371/5.2 |
| 5,467,341 | * | 11/1995 | Matsukane et al. .................... 370/17 |
| 5,606,563 | | 2/1997 | Lee . |
| 5,621,737 | * | 4/1997 | Bucher .................................. 371/5.1 |
| 5,627,837 | | 5/1997 | Gillett . |
| 5,724,362 | * | 3/1998 | Lau ....................................... 371/5.1 |
| 5,764,651 | * | 6/1998 | Bullock et al. ........................ 371/5.5 |
| 5,886,842 | * | 3/1999 | Ziperovich ............................. 360/51 |
| 6,073,257 | * | 4/2000 | Labonte et al. ....................... 714/704 |

OTHER PUBLICATIONS

Zhand Xiaoru; Zneg Lieguang: "Performance analysis of BIP codes in SDH on Poisson distribution of errors." Communication Technology Proceedings, ICCT '96, 1996 May 5–7, 1996, pp. 829–832, XP002146479 the whole document.

\* cited by examiner

Primary Examiner—Stephen Chin
Assistant Examiner—Dac V. Ha
(74) Attorney, Agent, or Firm—Marks & Clerk

(57) ABSTRACT

In a method of detecting signal degradation conditions in synchronous digital signals, the error monitors first detect the presence and/or absence of a particular bit error ratio by integrating received parity errors over time. Subsequently a monitor client reacts to notifications from bit error rate monitors that the state of the presence/absence of specific bit error ratios has changed to generate an alarm condition when appropriate.

13 Claims, 1 Drawing Sheet

METHOD OF DETECTING SIGNAL DEGRADATION FAULT CONDITIONS WITHIN SONET AND SDH SIGNALS

FIELD OF THE INVENTION

This invention relates to a method of detecting signal degradation fault conditions in synchronous digital signals, for example within SONET and SDH signals.

BACKGROUND OF THE INVENTION

SONET (Synchronous Optical Network) is a physical layer standard for fiber optic transmissions. SDH (Synchronous Digital Hierarchy—is an international standard of optical signals, payload formatting, and operations. Within the overheads of the various signal types that are defined within the SONET and SDH standards, there are bytes that are dedicated for use as bit interleaved parity checks (BIPs). By counting the number of BIP errors that are detected when such a signal is received, an estimate for the actual line error ratio can be obtained. While the correspondence between the number of BIP errors detected and the actual line bit error ratio has been documented, little (if any) guidance is presented as to how these relationships can actually be incorporated into an algorithm that facilitates the implementation of such a system.

The manner in which the signal degrade fault condition is monitored involves the integration of the number of BIP errors detected over time and comparing the result to a pre-determined threshold value. Should this number of errors exceed the threshold for the signal degrade fault condition, then it can be stated that the condition exists. A complication introduced by the SONET/SDH requirements is that they dictate the detection time for any line bit error ratio must be a factor of the actual bit error ratio, and not a factor of the signal degrade threshold that is being used. As such, it is necessary to monitor for multiple bit error ratios concurrently and make decisions concerning the presence (or absence) of signal degrade based on these results. This is typically accomplished by polling the received BIP error counts at a rate which is at least half of the required detection time for the highest bit error ratio to be monitored, and to maintain a history of these samples for a duration of time that is equal to the required detection time of the lowest bit error ratio.

The aforementioned technique is simple and effective but given the wide range of bit error ratios that must be monitored (1E-5 to 1E-10) and their associated detection times, the amount of memory needed to maintain a sample history of the appropriate length can get quite large. While this may not prove to be an issue for applications that have large memory resources, it can be paramount to those applications with smaller, fixed memory resources.

An object of the present invention is to address the issue of excessive memory usage that a typical application would require.

SUMMARY OF THE INVENTION

According to the present invention there is provided a method of detecting signal degradation conditions in synchronous digital signals, comprising the steps of detecting the presence and/or absence of particular bit error ratios by integrating received parity errors over time in a plurality of bit error monitors, and reacting to notifications from bit error rate monitors that the state of the presence/absence of specific bit error ratios has changed to take a predetermined action depending on the state of the monitors.

In the invention, the functionality required to detect signal degradation is broken down into two distinct entities. The first, referred to as the bit error rate monitor, is solely responsible for detecting the presence and/or absence of a particular bit error ratio from integrating received parity errors over time (note that multiple instances of this monitor can be used to detect different error rates simultaneously). The second entity, referred to as the bit error rate monitor client, is responsible for reacting to notifications from bit error rate monitors that the state of the presence/absence of specific bit error ratios has changed.

In addition, the polling of receive error counts needs only be done at a single interval by a single polling application.

Any bit error rate monitor can be used to watch for a specific bit error ratio in a received signal. In order to accomplish this, it needs to be configured properly and supplied with samples of error counts at regular intervals (i.e. via polling). Within the bit error rate monitor there is a state machine whose intent is to keep track of whether the monitor is currently detecting a bit error ratio that is either equal to or greater than its currently programmed monitored bit error ratio (the "equal to or exceeded" state), or is less than this ratio (the "less than" state). Also within the object is a queue of parity error count samples that is used to integrate the number of errors that have occurred over a fixed length of time (expressed as an integer number of samples). This integration is accomplished using a sliding window technique.

Every time a new error count sample is received, the value at the head of the sample queue is removed and subtracted from the total number of errors that have been accumulated over the width of the integration window. The new sample is then inserted at the tail of the queue and added to this accumulated total. This new total is then compared to the parity error count threshold value and if it is less than the threshold, the bit error rate monitor is deemed to be in the "less than" state. If it is equal to or greater than this threshold, then it is in the "equal to or exceeded" state.

A unique side effect of the fact that the bit error rate monitors are provided with parity error count samples (rather than being responsible for obtaining their own) is that it is not necessary that this sample be provided from a hardware register of a parity checking device. In fact, it is possible that this parity error count sample can be provided by another instance of a bit error rate monitor. As a result, the concept of an "upper monitor" can be introduced whereby a bit error rate monitor can be configured to supply its "upper monitor" (another instance of a bit error rate monitor) with parity error count samples determined from the error count samples that it is supplied with. By supplying the "upper monitor" with the sum of every n error count samples, the "upper monitor" is effectively being supplied with the same parity error counts as the bit error rate monitor, except at n times the sampling rate. This allows multiple bit error monitors to be linked together in order to detect the presence of several different bit error rates simultaneously.

The invention also provides an apparatus for detecting signal degradation conditions in synchronous digital signals, comprising a plurality of monitors for detecting the presence and/or absence of particular bit error ratios by integrating received parity errors over time; and a bit error rate monitor client responsive to outputs from said plurality of monitors to take a predetermined actions depending on the state of said plurality of bit error monitors.

BRIEF DESCRIPTION OF THE DRAWINGS

The invention will now be described in more detail, by way of example only, with reference to the accompanying drawings, in which.

DESCRIPTION OF THE PREFERRED EMBODIMENTS

Figure 1:
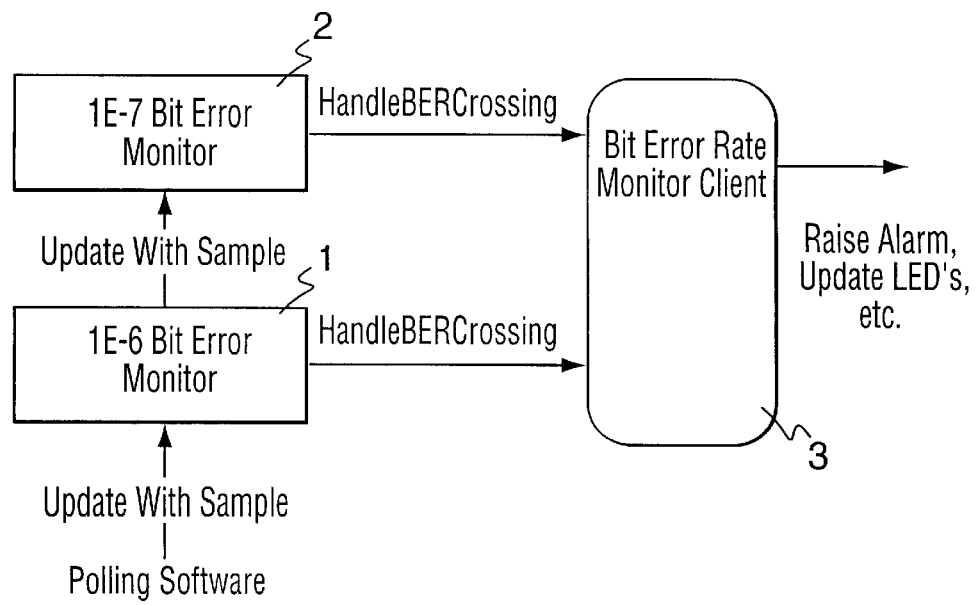
FIG. 1 illustrates a system using bit error monitors and a bit error rate monitor client to detect changes in the received bit error rate.

In FIG. 1, error monitors 1, 2 are solely responsible for detecting the presence and/or absence of a particular bit error ratio in, for example, a SONET signal. Client 3 reacts to errors reported by the monitors 1, 2 to raise an alarm when appropriate.

In the system shown in FIG. 1, an alarm is to be raised whenever the bit error ratio of a received signal exceeds 1E-6. This alarm is then cleared when the received bit error ratio drops below one tenth of this threshold, 1E-7. In order to implement this, two instances of the bit error rate monitors (1, 2) and one instance of a bit error monitor client (3) are necessary.

Each of the bit error rate monitors 1, 2 is configured to detect the presence of a single bit error ratio. Monitor 1 detects the presence of 1E-6 whereas monitor 2 detects 1E-7. The sole function of these two monitors is to detect the presence of the bit error ratio that they are configured to observe. It then becomes the responsibility of the bit error monitor client 3 to determine when the actual alarm is to be raised and cleared. The bit error monitors themselves do not have any knowledge of this alarm whatsoever.

After performing statistical analysis (which is very specific to the exact signal being monitored, any required detection times, etc.), it is determined that the 1E-6 monitor 1 will need to sample the number of received parity errors every 50 ms and integrate over 10 samples to accurately detect its bit error rate. Similarly, the 1E-7 monitor 2 will need to sample at 400 ms and also integrate over 10 samples. The system thus polls the hardware every 50 ms and updates the 1E-6 monitor 1 with these 50 ms error count samples. The 1E-7 monitor 2 object is configured as an "upper monitor" of the 1E-6 object that needs to be provided with an parity error count every eight samples (as 50 ms×8=400 ms). Thus the 1E-6 object 1 creates 400 ms parity error count samples out of eight consecutive 50 ms samples. Upon accumulating each 400 ms sample, the 1E-6 monitor 1 updates the 1E-7 monitor 2 and starts the process all over again. This results in the 1E-7 bit error rate monitor effectively sampling the received parity error count at 400 ms intervals.

Whenever either of the bit error rate monitors detects a crossing of their respective parity error count threshold (either from below-to-above the threshold, or from above-to-below the threshold), they inform the bit error monitor client of this crossing. This client then considers the current state of both of the monitors and proceeds to raise/clear alarms however appropriate.

If the simple example is considered, the amount of memory conservation that can be obtained with this detection algorithm can be demonstrated. Assuming that each parity error count sample can be stored within a single byte of memory, the amount of memory required by the bit error rate monitors if both required error samples at 50 ms intervals would be:

| | | |
|---|---|---|
| 1E-6 monitor sample queue: | (50 ms/50 ms) × 8 | =8 bytes |
| 1E-7 monitor sample queue: | (400 ms/50 ms) × 8 | =64 bytes |
| Total memory useage: | | =72 bytes |

In comparison, the memory requirements of these two monitors if the "upper monitor" concept was used to link the two together would be:

| | | |
|---|---|---|
| 1E-6 monitor sample queue: | (50 ms/50 ms) × 8 | =8 bytes |
| 1E-6 monitor upper monitor queue: | (400 ms/50 ms) × 1 | =8 bytes |
| 1E-7 monitor sample queue: | (400 ms/400 ms) × 8 | =8 bytes |
| Total memory useage: | | =24 bytes |

Therefore, one can conclude that if the bit error rate monitors of the example were linked together using the "upper monitor" algorithm, the memory requirements of the application would be over 66% less than if they both independently integrated their parity error rate samples at 50 ms intervals. It should also be indicated that the memory savings that can be obtained through the use of the "upper monitor" algorithm would in proportion to the number of bit error rates being concurrently detected and the range of these error rates.

The monitors and clients are implemented in object-oriented software.

Protocol/Procedure Entry Points

Bit Error Rate Monitor

A bit error rate monitor class is used to assist with approximately the bit error rate of a received signal. The BMon__BERMonitor__cl class defines an individual layer that can be used to detect a single bit error rate. Typically, several of these layers are combined to allow for the monitoring of several bit error rates simultaneously. Those which are currently defined are:

(1) int SetBitErrorRate (BERD__tBitErrorRate errorRate)

Provides an ability to set the error count threshold which must correspond to the bit error rate that is to be monitored for with the current window size.

This function always returns a zero (0).

(2) int SetErrorCountThreshold (long errorCountThreshold)

Provides an ability to set the error count threshold which must correspond to the bit error rate that is to be monitored for with the current window size.

This function always returns a zero (0).

(3) int SetWindowSize (int windowSize)

Allows the integration window size to be set. The parameter windowSize stipulates the number of samples that exist within the integration window.

This function always returns a zero (0).

(4) int AddAHigherOrderMonitor ( BMon__BERMonitor__cl* highOrderMonitor int highOrderMonitorWindowSize)

This permits a second bit error rate monitor object to be attached to the current bit error rate monitor object. This permits several BER monitor objects to be "daisy-chained" together so that multiple error rates may be monitored for simultaneously. The parameter upperMonitor provides a reference to the BER monitor object being attached. The second parameter, highOrderMonitorWindowSize, indicates the number of error count samples must be accumulated by the BER monitor into a single error count sample that is to be provided to highOrderMonitor.

Should this function be called while the BER monitor object already has a higher order monitor, the current higher order monitor will be removed, and that passed in the parameter highOrderMonitor will replace it.

This function returns a zero (0) if the indicated high order monitor object was successfully added to the BER monitor object in question. Otherwise, a value of greater than one will be returned.

(5) int AddAClient( BERC__BERClient_cl* myClient)

This method allows for a bit error rate monitor client object (specified by the parameter myClient) to be attached to the BER monitor in question. The indicated client will then be informed by the BER monitor object whenever it detects that the received bit error rate has exceeded its programmed threshold, or fallen below its threshold.

Should this function be called while the BER monitor object already has a client object, the current client will be removed, and that which is passed in the parameter myClientwill replace it.

This function returns a zero (0) if the indicated client object was successfully added to the BER monitor object in question. Otherwise, a value of greater than one will be returned.

(6) int UpdateWithSample (long newSample)

This function is called to provide the monitor with a number sample of errors. The parameter accepted, newSample, contains this latest error count sample.

This function always returns a value of zero (0).

(7) int Reset (void)

This function is used to reset the bit error rate monitor. It is used only to zero out the accumulated history of error counts and it does not affect the currently programmed threshold, window size or any of the next monitor characteristics.

This function always returns a value of zero (0).

Bit Error Rate Monitor Client

The interface defined by the bit error rate monitor client class (BERC__BERClient_cl) is that which is required so that proper interfacing to instance of the bit error rate monitor class can occur. Currently, only one such interface exists, and it is defined as:

(1) int HandleBERCrossing (BERD_tBitErrorRate errorRate, BERD_tBERMonStateType direction)

This function is defined as a pure virtual function that must be implemented by classes derived from the BERC__BERClient_cl class. It is intended to initiate the response of the bit error rate client object to the indication that the bit error rate indicated by the parameter errorRate has been crossed. The parameter direction is used to indicate whether the estimated bit error rate is greater than or equal to errorRate (BERD_eExceededOrEqualTo) or is less than errorRate (BERD_eLessThan).

This function always returns a value of zero (0).

The following methods are defined as utilities within the bit error rate monitor class:

(1) BERD_tBERMonStateType GetStateOfBERMonitor (void)

This function can be called to determine the instantaneous state of the bit rate monitor in question. The value returned indicates whether the current bit error rate is equal to or greater than the programmed threshold (BER__eExceededOrEqualTo), or whether it is less than the programmed threshold (BER_eLessThan).

The bit error rate monitor class is usually initialized during its construction. To accommodate this, the following constructors are defined:

(1) BMon__BERMonitor_cl ( )

This is the default constructor for the bit error rate monitor class. It creates an instance of the BMon__BERMonitor_cl class which has no client and its threshold is set to one. By default, the integration window size is set to one.

(2) BMon__BERMonitor_cl ( BERC__BERClient_cl* myClient, BERD_tBitErrorRate myBitErrorRate, int myWindowSize, long myErrorCountThreshold)

This constructor provides better initialization than the default constructor whenever an object is instantiated. The parameters that are accepted by this function are used to configure the BER monitor object. They are used to indicate the client of the monitor object (myClient), the actual bit error rate associated with the object (myBitErrorRate), the size (in samples) of the integration window that it is to use (myWindowSize) as well as the number of error counts that must occur during the integration window to exceed a the bit error rate specified in myBitErrorRate (myErrorCountThreshold).

(3) BMon__BERMonitor_cl (BMon__BERMonitor_cl ©)

This method is a copy constructor which is used to instantiate an of object of the BMon__BERMonitor_cl class with the same client and configuration information as that referenced by the parameter copy. Note that the history of samples maintained by the source object is not copied to the destination object.

Only a single constructor is currently defined for the bit error rate monitor client. Its interface is as follows:

(1) BERC__BERClient_cl ( )

This is the default constructor of the bit error rate monitor client class. As this is an abstract base class that defines an interface only, the constructor doesn't do anything, as there is nothing to initialize.

The interface of the destructor that is provided by the error rate monitor is:

(1) ~BMon_tBERMonitor_cl (void)

This function acts as the destructor for the bit error rate monitor class.

The interface of the destructor that is provided by the bit error rate monitor client is:

(1) ~BERC_tBERClient_cl (void)

This function acts as the destructor for the bit error rate monitor client class.

The type (BERD_tBitErrorRate) is defined to easily allow identification of the exponent part of the approximate bit error rate that is being received on a given signal. It should be noted that the valued defined with the BER__e1Emx is actually used to indicate a bit error rate of $10^{-x}$. The valid values of this type are:

| | |
|---|---|
| BERD_eUnknown | // 0 |
| BERD_e1Em1 | // 1 |
| BERD_e1Em2 | // 2 |
| BERD_e1Em3 | // 3 |
| BERD_e1Em4 | // 4 |
| BERD_e1Em5 | // 5 |
| BERD_e1Em6 | // 6 |
| BERD_e1Em7 | // 7 |
| BERD_e1Em8 | // 8 |
| BERD_e1Em9 | // 9 |
| BERD_e1Em10 | // 10 |
| BERD_e1Em11 | // 11 |

This enumerated type (BERD_tBERMonStateType) is used to indicate the current state of a particular BER monitor object. The valid values of this type are:

| | |
|---|---|
| BERD_eLessThan | // 0 |
| BERD_eExceededOrEqualTo | // 1 |

Bit Error Rate Monitor
(1) BERC_BERCient_cl* myClient
    This member variable is used to provide a reference to the bit error rate monitor client that is to be informed should the BER monitor detect that it has either exceeded, or fallen below, its current threshold within its programmed integration window.
(2) BERD_tBitErrorRate myBitErrorRate {private}
    This is used to contain the approximate bit error rate that is being monitored for. While it is not actually used within the implementation of the monitoring, it must be specified to the registered client object whenever it is informed of a change in state.
(3) BERD_tBERMonStateType currentState {private}
    This variable is used to maintain the current state of the bit error rate monitor device. When the number of error counts in the programmed integration window be greater than or equal to myErrorCountThreshold, then it have the value of BER_eExceededOrEqualTo. Otherwise, it will have the value of BER_eLessThan.
(4) BMon_BERMonitor_cl* myUpperMonitor {private}
    This provides a reference to the BER monitor object that resides "above" the BER Monitor in question. This is the object that the BER Monitor will be providing samples to.
(5) CirLQ_LongQueue_cl* myUpperMonitorSampleQ {private}
    This provides a reference to the circular queue of long integers that is used to accumulate bit error rate samples for the bit error rate monitor object that is registered with the bit error rate monitor for error count samples.
(6) CirLQ_LongQueue_cl* mySampleQ {private}
    This provides a reference to the circular queue of long integers that is used to maintain the error count samples that are within the integration window of the bit error rate monitor object in question.
(7) long myErrorCountThreshold {private}
    Maintains a copy of the current threshold that is to be used by the BER monitor.
(8) long myRunningTotal {private}
    Contains the total of error counts that exist within the current integration window. This value is updated everytime that a new sample is provided to the BER monitor object.

Any bit error rate monitor object can be used to monitor for a specific bit error rate in a received signal. In order to accomplish this, it needs to be configured and supplied with samples of error counts at regular intervals (i.e. via polling).

Within the monitor object 1, 2 itself is a simple state machine. This machine keeps track of whether the monitor object is currently detecting a bit error rate that is either equal to or greater than its currently programmed monitored bit error rate (the BER_eExceededOrEqualTo state), or is less than this rate (the BER_eLessThan state). Also within the object is a circular queue of error count samples that is used to integrate the number of errors that have occurred over a fixed length of time (expressed as an integer number of samples). This integration is accomplished using a sliding window technique.

Every time a new error count sample is received, the value at the tail of the sample queue is removed and subtracted from the total number of errors that have been accumulated over the width of the integration window. The new sample is then inserted at the head of the queue and added to this accumulated total. This new total is then compared to the programmed error count threshold value and if it is less than the threshold, the monitor object is deemed to be in the BER_eLessThan state. If it is equal to or greater than this threshold, then it is in the BER_eExceededOrEqualTo state.

The length of the integration window and the error count threshold are configurable via publicly exported member functions, and differ depending on the signal being monitored and the bit error rate of interest. Anytime that either of these values are changed, the error count samples within the queue are overwritten with zeros (thus restarting the integration process.

The above indicates the basic functionality provided by a BER Monitor object. However to provide greater versatility, the object is also capable of performing the following:

(i) The definition of the BER Monitor class provides for the registration of a BER Monitor Client object (or an instance of one of its derived classes). This client object is informed of all state changes that occur within the BER Monitor. The intent here was to allow the client object to perform additional processing whenever it was notified of such a state change.

(ii) Secondly, the BER Monitor class definition also permits the BER monitor object to provide another BER monitor object (referred to as the "upper monitor") with error count samples. The samples provided to the "upper monitor" can either be identical to those received by the BER monitor object, or more commonly, the sum of a fixed number of the samples it receives (e.g. the "upper monitor" is provided with the sum of every n samples). This allows the BER monitor object to sample the received errors at a particular rate and the "upper monitor" to effectively sample the same received errors at an integer multiple of that sampling rate (e.g. the "upper monitor" is using n times the sampling rate of the BER monitor object). Note that this feature permits several BER monitor objects to be linked together to monitor for different bit error rates simultaneously.

Any suitable method can be employed for detecting the error ratio from the raw BIP information. Two possible methods are as follows:

Method 1

Assuming a Poisson distribution of single-bit errors on the incoming SONET signal.

K=number of bits in the frame.
BER=bit error ratio
P(n)=probability of having n bits in error
The probability of having no bits in error:

$$P(n=0) = (1-BER)^K$$

The probability of having one bit in error:

$$P(n=1) = K \cdot (BER) \cdot (1-BER)^{K-1}$$

Therefore the general case of the probability of having n bits in error:

$$P(n) = \frac{K!}{n!(K-n)!} \cdot (BER)^n \cdot (1-BER)^{K-n}$$

which is the Binomial Distribution.

Error detection methods will only show that there were one or more errors in the previous frame. Therefore, the probability that there was at least one or more errors is:

$$P(n \geq 1) = 1 - (1-BER)^K$$

However, a BIP only shows that there was an error when the number of errors in the previous frame was odd. The final equation is somewhat different, although the initial assumptions are similar:

Using the definition of a Binomial Distribution:

$$(x+y)^K = \sum_{n=0}^{K} \left(\frac{K!}{n!(K-n)!}\right) y^n x^{K-n} \qquad (1)$$

and $$(x-y)^K = \sum_{n=0}^{K} \left(\frac{K!}{n!(K-n)!}\right) (-y)^n x^{K-n} \qquad (2)$$

Subtracting equation (2) from (1) and dividing by two you obtain:

$$\frac{(x+y)^K - (x-y)^K}{2}$$

What remains is the sum of the odd terms while the even terms will cancel to zero. Now substituting x=(1−BER) and y=BER you obtain:

$$P(n \geq 1) = \frac{1 - (1 - 2 \cdot BER)^K}{2}$$

which is the probability that there will be at least one error in the previous frame when using a parity check for error detection.

Method 2

Using:
K=number of bits in the frame.
BER=bit error ratio
P(n)=probability of having n bits in error
Pr=probability of registering that the block is errored
For the Poisson Distribution:

$$P(n) = \frac{(K \cdot BER)^n \cdot e^{-K \cdot BER}}{n!}$$

Using J=K.BER $$P(n) = \frac{J^n \cdot e^{-J}}{n!}$$

and $$Pr = \sum_{n=0}^{\infty} P(n)$$

for odd n.

$$Pr = e^{-J} \sum_{n=0}^{\infty} \frac{J^n}{n!}$$

for odd n.

$Pr = e^{-J} . \sin h\, J$ $Pr = 0.5 e^{-J}(e^J - e^{-J})$ $Pr = 0.5(1 - e^{-2 \cdot K \cdot BER})$  (4)

For example, in the SONET/SDH B2 bytes of an OC-3/STM-1, the BIP-24 monitors the whole frame, minus 27 bytes (Columns 1–9 of Rows 1–3).

i.e. [(9×270)−27]×8=19224 bits.

The number of bits monitored by each parity bit is 19244/24=801 bits.

Thus the probability of a parity bit error, at line error ratio BER is:

$$Pr = 0.5(1 - e^{-1602 \cdot BER}) \qquad (5)$$

In comparing the two methods using some actual numeric values on a calculator, the two results were found to be within 0.04% of each other. The first method uses the Binomial distribution whilst the second uses the Poisson, so for large populations (number of bits) and low probability (small error ratio) the two will yield similar results.

Given the relationship between the error ratio and probability of a parity error, the next task is to accumulate parity errors over a known window, and to calculate the threshold for detecting the error ratio to a chosen confidence limit. There are a number of possible methods for achieving this, with different levels of complexity and speed of detection time:

Simple fixed window algorithm: accumulate BIP errors over a fixed number of frames; raise alarm if threshold reached; reset counters for next window.

Blocked fixed window algorithm: accumulate BIP errors over a block of frames; raise block alarm if threshold reached; accumulate errored blocks and raise error ratio alarm on threshold; reset counters for next window.

Simple sliding window algorithm: accumulate BIP errors over a sliding window of frames; raise alarm if threshold reached; reset counters for next window.

Exponential sliding window algorithm: accumulate weighted BIP errors over a sliding window of frames; weighting for most recent=most important; raise alarm if threshold reached.

The sliding window algorithms may provide faster detection times for a given confidence limits, since if errors start to occur during a fixed window the error ratio may not be detected until the end of the next fixed window. The use of blocks of frames or exponential sliding windows can filter error bursts, at the expense of further additional complexity and reduced error ratio discrimination, although requirements for this are unclear.

The following is limited to simple fixed windows, since these are easiest to implement in hardware for fast detection, or in software by simply polling a BIP error accumulation register at regular periods.

Using the simple fixed window technique, the number of BIP errors is accumulated over a fixed number of frames. Having the probability of a single BIP error at a given error ratio, the probability of detecting N or more BIP errors can be calculated. Thus a suitable value of N can be determined, to give a high probability of N or more BIP errors at a given error rate, but a low probability at half that error ratio.

Figure 2:
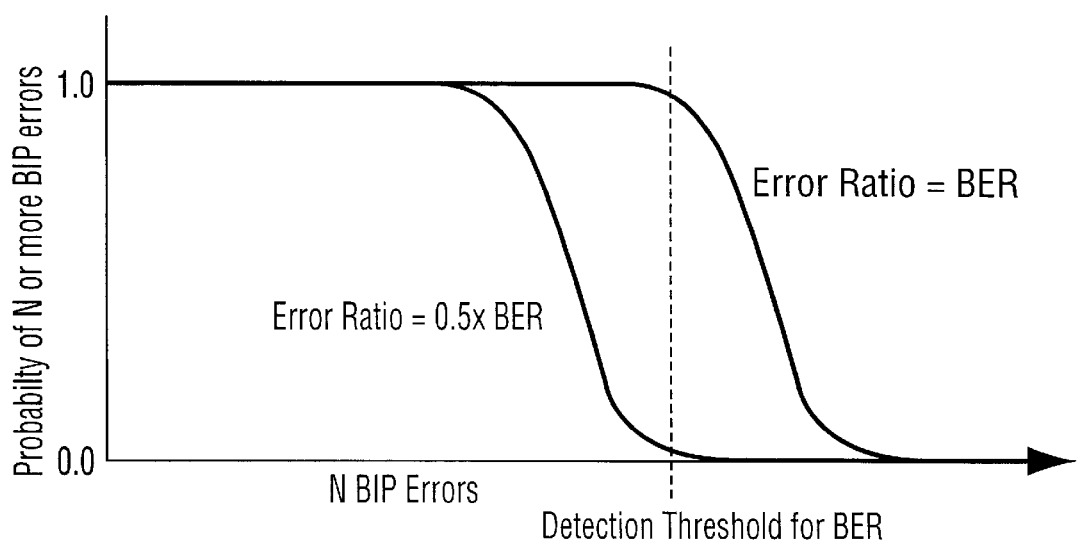
FIG. 2 is a graph of BIP Error Probability against N BIP errors.

FIG. 2 shows a sketch of the general shape of the graphs obtained, when calculating the accumulated probability of N or more BIP errors within a fixed window. The higher the error ratio the greater the number of BIP errors that may be accumulated. The dashed line shows the desired threshold point for the error ratio BER, with a high probability of accumulating that many BIP errors at BER, and a low probability at half that rate.

To generate the required figures the Binomial distribution may be used. To calculate the probability of exactly N errors occurring:

$$P(N) = \frac{W!}{N!(W-N)!} \cdot (Pr)^N \cdot (1-Pr)^{W-N}$$

where

W=number of BIPs in the window,

Pr=Probability of a BIP error.

The probability of N or more BIP errors is:

$$P(\square N) = 1 - \sum_{N=0}^{N-1} P(N) \quad (6)$$

To calculate values for equation (6) the following program 'pcal' listed below was written and listed in Appendix A. Because of the large nature of some of the numbers in the binomial expansion, (e.g. $10^6$ factorial) the expansion and probabilities must be calculated incrementally, and multiplied by adding their logarithms. The calculations proceed as follows:

$$Pa(N) = \frac{L!}{N! \cdot (L-N)!} \cdot Pr^N \cdot (1-Pr)^{(L-N)}$$

where L=no. of bits in window.

$$\log(Pa(N)) = \log(A(N)) + \log(B(N))$$

Binomial $$A(N+1) = A(N) + \log\left(\frac{(L-N+1)}{N}\right)$$

Probability $$B(N+1) = B(N) + \log\left(\frac{Pr}{1-Pr}\right)$$

$$C(N) = A(N) + B(N)$$

Result $$Pa(N) = 10^{C(N)}$$

Before the antilog of C(N) is calculated the value is checked, since the antilog of a large negative number may cause a numerical overflow (this is machine dependant).

The program will run on the Sun workstations and should be compiled with the command:

cc pcal_v3.c–lm

The –lm switch is required to link in the math library.

The following example shows the use of the program to calculate a $10^{-3}$ alarm for an OC-3/STM-1 signal, using the BIP-24 with a fixed window approach.

The criteria listed below have been chosen for this alarm:

Maximum detection time=8 msec (64 frames).

Confidence for detection time=98%

Probability of clearing the alarm=95% at $10^{-4}$ (for hysterisis).

Very low probability of raising the alarm within $10^4$ sec at $0.5 \times 10^{-3}$ error ratio. (check to see if acceptable when threshold calculated)

With a fixed window calculation, the detection time is dependant on the start position of the window relative to the start of errors. So if the window length is set to 32 frames, this always gives a full window within 10 msec from start of errors. Average detection time is dominated by the average position of the window relative to a 8 msec errored period. Note that this assumes that the line system goes from zero error ratio to $10^{-3}$ error ratio as a step function. This may or may not be realistic in real-life, but would represent the situation of the equipment under compliance testing, where an error ratio is suddenly injected and the detection time is measured.

Running pcal_v3 on a sun workstation the (sampled) results shown below were obtained.

Enter Error Ratio: 1e-3

Enter number of frames: 32

| | Mapping | Byte used | bits per parity bit |
|---|---|---|---|
| (a) | OC-3/STM-1 | B2 | 801 per frame |
| (b) | VC-4 | B3 | 2349 per frame |
| (c) | VC-3 | B3 (SDH) | 765 per frame |
| (d) | STS-1 | B3 (SONET) | 783 per frame |
| (e) | VT-6/TU-2 | V5 | 1712 per multi-frame |
| (f) | VT-2/TU-12 | V5 | 510 per multi-frame |
| (g) | VT-1.5/TU-11 | V5 | 416 per multi-frame |

Select Mapping (a–g): a

P1 Error Ratio=0.001

P2 Error Ratio=0.0005

P3 Error Ratio=0.0001

Number of Frames=32

Number of BIPs=768

Probability of a BIP Error at 0.001 Error Ratio 0.399253

Probability of a BIP Error at 0.0005 Error Ratio=0.27556

Probability of a BIP Error at 0.0001 Error Ratio= 0.0740133

Cumulative Probability Calculation (N or More)

| N | P1 | P2 | P3 | Diff:P1-P2 |
|---|---|---|---|---|
| 40 | 1.000000e + 00 | 1.000000e + 00 | 9.904996e − 01 | 0.00950036 |
| 41 | 1.000000e + 00 | 1.000000e + 00 | 9.858581e − 01 | 0.0141419 |
| 42 | 1.000000e + 00 | 1.000000e + 00 | 9.794364e − 01 | 0.0205636 |
| 43 | 1.000000e + 00 | 1.000000e + 00 | 9.707703e − 01 | 0.0292297 |
| 44 | 1.000000e + 00 | 1.000000e + 00 | 9.593569e − 01 | 0.0406431 <- (b) |
| 45 | 1.000000e + 00 | 1.000000e + 00 | 9.446797e − 01 | 0.0553203 |
| 46 | 1.000000e + 00 | 1.000000e + 00 | 9.262410e − 01 | 0.073759 |

-continued

| N | P1 | P2 | P3 | Diff:P1-P2 | |
|---|---|---|---|---|---|
| 47 | 1.000000e + 00 | 1.000000e + 00 | 9.036010e − 01 | 0.096399 | |
| 48 | 1.000000e + 00 | 1.000000e + 00 | 8.764195e − 01 | 0.123581 | |
| 49 | 1.000000e + 00 | 1.000000e + 00 | 8.444956e − 01 | 0.155504 | |
| 50 | 1.000000e + 00 | 1.000000e + 00 | 8.078029e − 01 | 0.192197 | |
| 51 | 1.000000e + 00 | 1.000000e + 00 | 7.665134e − 01 | 0.233487 | |
| 60 | 1.000000e + 00 | 1.000000e + 00 | 3.019849e − 01 | 0.698015 | |
| 70 | 1.000000e + 00 | 1.000000e + 00 | 3.301487e − 02 | 0.966985 | |
| 80 | 1.000000e + 00 | 1.000000e + 00 | 9.636792e − 04 | 0.999036 | |
| 90 | 1.000000e + 00 | 1.000000e + 00 | 7.919461e − 06 | 0.999992 | |
| 100 | 1.000000e + 00 | 1.000000e + 00 | 1.992733e − 08 | 1 | |
| 150 | 1.000000e + 00 | 9.999998e − 01 | 1.546541e − 13 | 1 | |
| 200 | 1.000000e + 00 | 8.153405e − 01 | 1.546541e − 13 | 1 | |
| 240 | 9.999996e − 01 | 1.053158e − 02 | 1.546541e − 13 | 1 | |
| 250 | 9.999857e − 01 | 9.975194e − 04 | 1.546541e − 13 | 0.999986 | |
| 260 | 9.996976e − 01 | 5.457759e − 05 | 1.546541e − 13 | 0.999698 | |
| 270 | 9.963077e − 01 | 1.723318e − 06 | 1.546541e − 13 | 0.996308 | |
| 271 | 9.953950e − 01 | 1.183585e − 06 | 1.546541e − 13 | 0.995395 | |
| 272 | 9.942866e − 01 | 8.084563e − 07 | 1.546541e − 13 | 0.994287 | |
| 273 | 9.929483e − 01 | 5.492095e − 07 | 1.546541e − 13 | 0.992948 | |
| 274 | 9.913414e − 01 | 3.710612e − 07 | 1.546541e − 13 | 0.991341 | |
| 275 | 9.894231e − 01 | 2.493333e − 07 | 1.546541e − 13 | 0.989423 | |
| 276 | 9.871458e − 01 | 1.666264e − 07 | 1.546541e − 13 | 0.987146 | |
| 277 | 9.844575e − 01 | 1.107484e − 07 | 1.546541e − 13 | 0.984458 | |
| 278 | 9.813021e − 01 | 7.320859e − 08 | 1.546541e − 13 | 0.981302 | |
| 279 | 9.776190e − 01 | 4.813032e − 08 | 1.546541e − 13 | 0.977619 | |
| 280 | 9.733442e − 01 | 3.147082e − 08 | 1.546541e − 13 | 0.973344 | |
| 281 | 9.684103e − 01 | 2.046583e − 08 | 1.546541e − 13 | 0.96841 | |
| 282 | 9.627476e − 01 | 1.323675e − 08 | 1.546541e − 13 | 0.962748 | |
| 283 | 9.562846e − 01 | 8.514516e − 09 | 1.546541e − 13 | 0.956285 | <- (a) |
| 284 | 9.489493e − 01 | 5.447018e − 09 | 1.546541e − 13 | 0.948949 | |
| 285 | 9.406704e − 01 | 3.465496e − 09 | 1.546541e − 13 | 0.94067 | |

The point (a) gives the threshold to raise the alarm. i.e. there is a 95% probability of getting $\leq 283$ BIP errors within 32 frames at a $10^{-3}$ error ratio.

The point (b) gives the hysteresis threshold below which the alarm should be cleared if raised. i.e. there is a 95% probability of getting $\leq 44$ BIP errors within 32 frames at a $10^{-4}$ error ratio.

The probability of spuriously raising the alarm at $0.5 \times 10^{-3}$ error ratio over $10^4$ sec is:

$P = 1 - (1 - \text{prob. of raising alarm in window})^{(no.\ of\ windows)}$

Number of windows $= 10^4$ sec/4 msec $= 2.5 \times 10^{-6}$ $P = 1 - (1 - 8.5145E - 9)^{2.5E-6}$ $P_{spurious} = 0.021$

---

PROGRAM PCAL_V3.C

```
/******************************************************************/
/* pcal_v3.c                                                    */
/* Author: Alan Jennings                                        */
/* Date: 28 Mar 1995                                            */
/* Calculates thresholds for error ratio                        */
/* detection from BIP errors in SONET/SDH frames                */
/******************************************************************/
/* Calculates probabilities for most SONET/SDH BIPs             */
/* each BIP bit monitors k data bits.                           */
/* Using: Prob. of parity error at line error                   */
/* ratio Pe for a Poisson distribution given by                 */
/*                                                              */
/* Pr = 0.5(1 − exp(−2 * k * Pe))                               */
/*                                                              */
/* Cumulative Probability calculated using Binomial             */
/* Expansion:                                                   */
/*                                                              */
/* Pa(N) = L! . Pr ^ N . (1 − Pr) ^ (L-N)                       */
/*        N!.(L-N)!                                             */
/*                                                              */
/* where L = no. of bits in window.                             */
/*                                                              */
/* log(Pa(N)) = log(A(N) + log(B(N))                            */
/*                                                              */
```

-continued

```
                    PROGRAM PCAL_V3.C
/* Binomial A(N + 1) = A(N) + log( (L-N + 1)/N)      */
/*                                                   */
/*Probability B(N + 1) = B(N) + log( Pr/(1 – Pr))    */
/*                                                   */
/*        C(N) = A(N) + B(N)                         */
/*                                                   */
/*        Pa(N) = 10 ^ C(N)                          */
/*                                                   */
/*****************************************************/
/* Usage: pcal_v3                                    */
/*                                                   */
/*****************************************************/
#include <stdio.h>
#include <math.h>
main(){
long loop;
double pe1, pe2, pe3;  /* error ratios */
double frames;         /* no. of frames in fixed window */
double length;
double len_per_frame;
double bits_per_bip;
double pr1, pr2, pr3;
double 1pr1, 1pr2, 1pr3;
double pow();
double a1, b1, c1, d1, e1, f1;
double a2, b2, c2, d2, e2, f2, diff;
double a3, b3, c3, d3, e3, f3;
double getber();
double getframes();
char chbuff[10];
/*****************************************************/
/* print out title info  */
printf("\n\nSONET/SDH BIP Probability Calculator \n");
printf("By A.J. Jennings \n\n");
printf("Version: 3.0 \n\n");
/*****************************************************/
/* get parameters                */
pe1 = getber();
pe2 = 0.5 * pe1;   /* calc half of threshold for 10 ^ 4 sec test */
pe3 = 0.1 * pe1;   /* calc tenth of threshold for hysteresis */
frames = getframes();
printf("\n     Mapping    Byte used    bits per parity bit");
printf("\n (a)   OC-3/STM-1   B2       801 per frame");
printf("\n (b)   VC-4         B3      2349 per frame");
printf("\n (c)   VC-3         B3 (SDH)   765 per frame");
printf("\n (d)   STS-1        B3 (SONET) 783 per frame");
printf("\n (e)   VT-6/TU-2    V5       1712 per multi-frame");
printf("\n (f)   VT-2/TU-12   V5        510 per multi-frame");
printf("\n (g)   VT-1.5/TU-11 V5        416 per multi-frame");
printf("\n\n Select Mapping (a – g): ");
gets(chbuff);
switch(chbuff[0])
   {
   case 'a':
   case 'A':   len_per_frame = 24;
               bits_per_bip = 801;
               break;
   case 'b':
   case 'B':   len_per_frame = 8;
               bits_per_bip = 2349;
               break;
   case 'c':
   case 'C':   len_per_frame = 8;
               bits_per_bip = 765;
               break;
   case 'd':
   case 'D':   len_per_frame = 8;
               bits_per_bip = 783;
               break;
   case 'e':
   case 'E':   len_per_frame = 0.5;
               bits_per_bip = 1712;
               break;
   case 'f':
   case 'F':   len_per_frame = 0.5;
               bits_per_bip = 510;
               break;
   case 'g':
```

```
                     PROGRAM PCAL_V3.C
     case 'G':   len_per_frame = 0.5;
                 bits_per_bip = 416;
                 break;
     default:    printf("\n ERROR!\n");
                 exit(0);
     }
length = len_per_frame * frames;
/**************************************************************/
/* perform calc at the error ratio given, pe1, and at 1/2 this rate pe2    */
/* and 1/10 the rate pe3                                      */
/* calc prob of a parity error at this error ratio */
pr1 = 0.5 * (1-exp((double) (-2 * bits_per_bip * pe1)) );
pr2 = 0.5 * (1-exp((double) (-2 * bits_per_bip * pe2)) );
pr3 = 0.5 * (1-exp((double) (-2 * bits_per_bip * pe3)) );
/**************************************************************/
printf("\n P1 Error Ratio = % g \n", pe1);
printf(" P2 Error Ratio = % g \n", pe2);
printf(" P3 Error Ratio = % g \n", pe3);
printf(" Number of Frames = % g \n", frames);
printf(" Number of BIPs = % g \n\n", length);
printf(" Probability of a BIP Error at % g Error Ratio = % g \n\n", pe1, pr1);
printf(" Probability of a BIP Error at % g Error Ratio = % g \n\n", pe2, pr2);
printf(" Probability of a BIP Error at % g Error Ratio = % g \n\n", pe3, pr3);
printf(" Cumulative Probability Calculation (N or More)\n\n");
printf("N      P1      P2      P3       Diff:P1-P2 \n\n");
/**************************************************************/
/* Initialise Variables */
a1 = 0;
b1 = length * (log10(1 - pr1));
c1 = b1;
/* Note: maths problems with antilog of number less than -100 ish */
if(c1 < -100) c1 = -100;
d1 = pow((double)10, c1);
e1 = d1;
f1 = 0;
a2 = 0;
b2 = length * (log10(1 - pr2));
c2 = b2;
if (c2 < -100) c2 = -100;
d2 = pow((double)10, c2);
e2 = d2;
f2 = 0;
diff = 0;
a3 = 0;
b3 = length * (log10(1 - pr3));
c3 = b3;
/* Note: maths problems with antilog of number less than -100 ish */
if (c3 < -100) c3 = -100;
d3 = pow((double)10, c3);
e3 = d3;
f3 = 0;
/* Binonial increments */
1pr1 = log10 (pr1/(1 - pr1) );
1pr2 = log10 (pr2/(1 - pr2) );
1pr3 = log10 (pr3/(1 - pr3) );
/**************************************************************/
/* Main calculation Loop: calculate increments and add logs */
for ( loop = 1; loop < length; loop++){
          /* first probability */
          a1 = a1 + ( log10( (length - (double)loop + 1)/(double)loop));
          b1 = b1 + 1pr1;
          c1 = a1 + b1;
          if(c1 < -100) c1 = -100;
          d1 = pow( (double)10, c1);
          e1 = e1 + d1;
          f1 = 1 - e1;
          /* second probability */
          a2 = a2 + (log10( (length - (double)loop + 1)/(double)loop));
          b2 = b2 + 1pr2;
          c2 = a2 + b2;
          if (c2 < -100) c2 = -100;
          d2 = pow( (double)10, c2);
          e2 = e2 + d2;
          f2 = 1 - e2;
          /* third probability */
          a3 = a3 + ( log10( (length - (double)loop + 1)/(double)loop));
          b3 = b3 + 1pr3;
```

-continued

PROGRAM PCAL_V3.C

```
        c3 = a3 + b3;
        if (c3 < -100) c3 = -100;
        d3 = pow( (double)10, c3);
        e3 = e3 + d3;
        f3 = 1 - e3;
        diff = e3 - e1;
        /* Print results for interesting part of curves */
        if ( diff > 1e - 9)
            printf("%d %e %e %e %g\n", loop, f1, f2, f3, diff);
        }
} /* end of main */
/****************************************************************/
/* function to get Bit Error Ratio */
double getber(){
char buff[20];
double ber;
    printf("\nEnter Error Ratio: ");
    gets(buff);
    ber = atof(buff);
    return (ber);
}
/****************************************************************/
/* function to get frames */
double getframes(){
char buff[20];
double frames;
    printf("\nEnter number of frames: ");
    gets(buff);
    frames = atof(buff);
    return (frames);
}
****************************************************************
```

We claim:

1. A method of detecting signal degradation conditions in synchronous digital signals, comprising the steps of:

polling said synchronous digital signals to obtain a first set of sample parity error counts at predetermined intervals;

integrating a set of sample parity error counts in a first bit error rate monitor over a predetermined number of samples to determine a first bit error rate;

generating an output from said first bit error rate monitor when a first bit error rate condition is present;

creating a subset of sample parity error counts from said first set of sample parity error counts by selecting samples from said first set at specific intervals;

integrating said subset of sample parity counts over a predetermined number of samples of said subset in a second bit error rate monitor to determine a second bit error rate;

generating an output from said second bit error rate monitor when a second bit error rate condition is present; and reacting to said outputs from said bit error rate monitors that said first or second bit error rate conditions are present to take a predetermined action that depends on the state of both the bit error rate monitors.

2. A method as claimed in claim 1, wherein said predetermined action is the raising or clearing of an alarm.

3. A method as claimed in claim 1, wherein the bit error monitors generate outputs whenever they detect a crossing of their respective parity count threshold.

4. A method as claimed in claim 1, wherein each monitor includes a queue of parity count samples that is used to integrate the number of errors that have occurred over a fixed period of time.

5. A method as claimed in claim 4, wherein the number of errors is integrated using a sliding window technique.

6. A method as claimed in claim 5, wherein each time a new error count sample is received, the value at the head of the sample queue is removed and subtracted from the total number of errors that have been accumulated over the width of the integration window.

7. An apparatus for detecting signal degradation conditions in synchronous digital signals, comprising:

a first bit error rate monitor for receiving a set of sample parity error counts from said synchronous digital signals at predetermined intervals, integrating said set of sample parity counts over a predetermined number of samples to determine a first bit error rate, and generating an output when a first bit error rate condition is present;

a second bit error rate monitor for receiving a subset of sample parity counts from said set of sample parity error counts selected from said set at specific intervals, integrating said subset of sample parity counts over a predetermined number of samples of said subset to determine a second bit error rate, and generating an output when a second bit error rate condition is present; and a bit error rate monitor client responsive to outputs from said first and second bit error rate monitors to take a predetermined action that depends on the state of said both said bit error rate monitors.

8. An apparatus as claimed in claim 7, wherein said predetermined action is the raising or clearing of an alarm.

9. An apparatus as claimed in claim 8, wherein the bit error rate monitors generate output signals whenever they detect a crossing of their respective parity count threshold.

10. An apparatus as claimed in claim 7, wherein each monitor includes a queue of parity count samples, and an integrator for integrating the number of errors that have occurred over a fixed period of time.

11. An apparatus as claimed in claim 10, wherein said integrator uses a sliding window technique.

12. An apparatus as claimed in claim 11, wherein each time a new error count sample is received, said integrator removes the value at the head of the sample queue and subtracts it from the total number of errors that have been accumulated over the width of the integration window.

13. An apparatus as claimed in claim 7, wherein each said monitor includes a state machine that keeps track of whether the monitor is currently detecting a bit error ratio that is either equal to or greater than its currently monitored bit error ratio.

\* \* \* \* \*